(12) United States Patent
Benthien et al.

(10) Patent No.: US 11,834,183 B2
(45) Date of Patent: Dec. 5, 2023

(54) FASTENING APPARATUS AND FASTENING ARRANGEMENT FOR FASTENING A CABIN INTERIOR COMPONENT, AIRCRAFT CABIN AND AIRCRAFT

(71) Applicant: AIRBUS OPERATIONS GMBH, Hamburg (DE)

(72) Inventors: Stefan Benthien, Hamburg (DE); Hermann Benthien, Sottrum (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 348 days.

(21) Appl. No.: 17/212,072

(22) Filed: Mar. 25, 2021

(65) Prior Publication Data

US 2021/0300560 A1    Sep. 30, 2021

(30) Foreign Application Priority Data

Mar. 26, 2020   (DE) .................. 10 2020 108 392

(51) Int. Cl.
*B64D 11/00*   (2006.01)
*F16B 5/12*    (2006.01)

(52) U.S. Cl.
CPC .............. *B64D 11/003* (2013.01); *F16B 5/12* (2013.01); *Y10T 403/7111* (2015.01)

(58) Field of Classification Search
CPC .. B60R 5/00; B60R 5/003; B60R 7/08; B64D 11/003; F16B 2/065; F16B 5/12;
(Continued)

(56) References Cited

U.S. PATENT DOCUMENTS 3,087,009 A * 4/1963 Blanchet ................. F16L 3/221
174/149 R
4,118,838 A * 10/1978 Schiefer ................... F16L 3/13
248/68.1
(Continued)

FOREIGN PATENT DOCUMENTS

DE    10 2017 131 130 A1    6/2019
DE    10 2017 217 216 B4    9/2019
(Continued)

OTHER PUBLICATIONS

German Search Report for Application No. 10 2020 108 392.0 dated Mar. 19, 2021.

*Primary Examiner* — Josh Skroupa
(74) *Attorney, Agent, or Firm* — KDW FIRM PLLC

(57) ABSTRACT

A fastening apparatus and fastening arrangement for fastening a cabin interior component, aircraft cabin and aircraft. To improve installation time and maintenance time, a modular fastening apparatus makes the decoupled rotational attachment of cabin interior components to the attachment structure possible, which attachment structure is in turn supported by the primary structure of the aircraft. The cabin interior component, for example a luggage bin, can be fastened simply by the fastening apparatus. The fastening apparatus includes an inner sleeve which can be plugged over a predefined fastening tube. The fastening apparatus can compensate for tolerances between the attachment structure and the cabin interior component and can prevent transmission of undesired forces and torques.

20 Claims, 10 Drawing Sheets

(58) Field of Classification Search
CPC .. F16B 5/123; F16B 9/05; F16B 9/058; Y10T 24/44034; Y10T 24/44043; Y10T 24/44051; Y10T 403/7041; Y10T 403/71; Y10T 403/7111; Y10T 403/7176; Y10T 403/7182; Y10T 403/7188
USPC .......... 24/459, 460, 461; 403/362, 384, 386, 403/397, 398, 399
See application file for complete search history.

(56) References Cited

U.S. PATENT DOCUMENTS

| | | | | |
|---|---|---|---|---|
| 4,600,334 | A * | 7/1986 | Soussloff | F16D 1/094 242/573 |
| 5,842,668 | A * | 12/1998 | Spencer | B64D 11/003 244/119 |
| 6,860,455 | B1 * | 3/2005 | Richardson | E04D 13/08 248/74.1 |
| 7,770,848 | B2 * | 8/2010 | Johnson | F16L 3/1207 248/65 |
| 8,317,132 | B2 * | 11/2012 | Pein | B64D 11/003 244/118.5 |
| 8,430,358 | B2 * | 4/2013 | Schneider | B64D 11/003 244/118.6 |
| 8,727,278 | B2 * | 5/2014 | Moritz | B64D 11/003 244/118.5 |
| 10,457,395 | B2 * | 10/2019 | Nuss | B64D 11/003 |
| 10,527,202 | B2 * | 1/2020 | Kanie | B60R 16/0215 |
| 11,542,969 | B2 * | 1/2023 | Root | F16B 2/065 |
| 2010/0140409 | A1 * | 6/2010 | Poerner | B64D 11/003 244/131 |
| 2016/0297533 | A1 | 10/2016 | Le et al. | |
| 2019/0092473 | A1 | 3/2019 | Benthien | |
| 2019/0193871 | A1 | 6/2019 | Benthien | |

FOREIGN PATENT DOCUMENTS

| | | |
|---|---|---|
| JP | 2007/070074 A | 3/2007 |
| WO | WO 2003/063 647 A2 | 8/2003 |
| WO | WO 2017/155 554 A1 | 9/2017 |

* cited by examiner

FASTENING APPARATUS AND FASTENING ARRANGEMENT FOR FASTENING A CABIN INTERIOR COMPONENT, AIRCRAFT CABIN AND AIRCRAFT

CROSS-REFERENCE TO RELATED APPLICATION

This application claims priority to German Patent Application Ser. No. 10 2020 108 392.0 filed Mar. 26, 2020, the entire disclosure of which is incorporated by reference herein.

TECHNICAL FIELD

The disclosure herein relates to a fastening apparatus for fastening a cabin interior component to an attachment structure of an aircraft cabin. Furthermore, the disclosure herein relates to a fastening arrangement, an aircraft cabin and an aircraft which in each case use the fastening apparatus.

BACKGROUND

The interior design of aircraft cabins takes place according to the requirements of the customer. After assembly of the cabin interior parts, such as interior panels, monuments, seats or seat rows, in-flight entertainment, overhead bins and luggage bins and the like, up to now they have been fitted and installed individually into the cabin. This is time-consuming during the production.

If maintenance is carried out of systems which are situated between the interior panels and the fuselage, the interior parts have to be once again dismantled in a complicated manner, until the desired location is accessible. This is likewise time-consuming.

SUMMARY

The disclosure herein is based on an object of improving the installation times and maintenance times in the case of aircraft.

The object is achieved by way of the subject matter disclosed herein.

The disclosure herein provides a fastening apparatus set up for fastening a cabin interior component to an attachment structure of an aircraft cabin, the attachment structure having at least one fastening tube, the fastening apparatus having:

an inner sleeve which can be fixed on the fastening tube in such a way that the inner sleeve cannot be moved relative to the fastening tube, the inner sleeve having an inner sleeve opening, into which the fastening tube can be received;

an outer sleeve which can be fastened to the inner sleeve in such a way that the outer sleeve can be rotated relative to the inner sleeve about a common axis, the outer sleeve having an outer sleeve opening, which is configured to receive and to rotatably mount the inner sleeve, and an alignment region which is configured to align a holding element, which can be fastened to the outer sleeve, relative to the fastening tube; and a holding element which can be fixed on the cabin interior component in such a way that the holding element cannot be moved relative to the cabin interior component, the holding element being shaped in such a way that the holding element can be aligned relative to the fastening tube by way of the alignment region in an axial direction which is defined by way of the fastening tube.

It is preferred that the alignment region extends in a longitudinal direction which runs orthogonally with respect to an axial direction of the outer sleeve, and the alignment region is configured in such a way that, in the case of a movement of the holding element parallel to the longitudinal direction, the holding element can be displaced parallel to the axial direction.

It is preferred that the alignment region has a groove which tapers in the longitudinal direction, as viewed in plan view.

It is preferred that the groove has at least one obliquely running side wall region which is shaped in such a way that, when the holding element grips the wall region, the holding element can be displaced in the axial direction.

It is preferred that the outer sleeve has at least one outer limb which, in the installed state, projects in the direction of the holding element, in order to grip the holding element in a positively locking manner in a circumferential direction and to permit a displacement in an axial direction for the purpose of alignment.

It is preferred that the alignment region is configured on at least one outer circumferential face of the outer sleeve.

It is preferred that the alignment region is configured on an outer circumferential face of the outer sleeve.

It is preferred that the alignment region is configured on an upper side of the outer sleeve. It is preferred that the alignment region is configured on a lower side of the outer sleeve. It is preferred that the alignment region is configured on a side which faces the holding element in the installed state.

It is preferred that the holding element is configured such that it can be plugged onto the outer sleeve in a direction orthogonally with respect to an axial direction of the outer sleeve.

It is preferred that the holding element has at least one holding limb which extends in a longitudinal direction which, in the installed state, runs orthogonally with respect to an axial direction of the outer sleeve, and the holding limb is configured in such a way that, in the case of a movement of the holding element parallel to the longitudinal direction, the holding element can be displaced parallel to the axial direction.

It is preferred that the holding limb tapers in the longitudinal direction, as viewed in a plan view.

It is preferred that the holding limb has at least one obliquely running contact face which is shaped in such a way that, when the contact face grips the outer sleeve, the holding element can be displaced in the axial direction.

It is preferred that the holding element has at least one stepped region which, in the installed state, faces the outer sleeve, in order to grip the outer sleeve in a positively locking manner in a circumferential direction and to permit a displacement in an axial direction for the purpose of alignment.

It is preferred that the holding element is shaped in such a way that it forms a contact over the full surface area with the alignment region in the installed state.

It is preferred that the holding element has at least one contact face which is configured to grip an outer circumferential face of the outer sleeve over the full surface area in the installed state. It is preferred that the holding element has at least one contact face which is configured to grip an upper side of the outer sleeve over the full surface area in the installed state. It is preferred that the holding element has at least one contact face which is configured to grip a lower side of the outer sleeve over the full surface area in the installed state. It is preferred that the holding element has at least one contact face which is configured to grip a side of the outer sleeve, which side faces the holding element, over the full surface area in the installed state.

The fastening apparatus preferably comprises a movement limiting device which is configured to limit the relative movement of the outer sleeve with respect to the inner sleeve to an angular range of less than 270 °.

It is preferred that the movement limiting device has a projection and a pair of blocking regions, the projection being arranged between the blocking regions and gripping one of the blocking regions at the end of the angular range. It is preferred that the movement limiting device is configured on the inner sleeve and the outer sleeve.

It is preferred that the inner sleeve opening is configured to form a contact over the full surface area with an outer circumferential face of the fastening tube in the installed state. It is preferred that the outer sleeve opening is configured to form a contact over the full surface area with an outer circumferential face of the inner sleeve in the installed state. It is preferred that the outer sleeve is configured such that it can be plugged onto the inner sleeve along an axial direction of the inner sleeve.

The fastening apparatus preferably comprises a fixing element. It is preferred that the fixing element is configured to block, in a fixed state, any movement of the inner sleeve relative to the fastening tube. It is preferred that the fixing element is configured to permit, in a released state, a movement of the inner sleeve relative to the fastening tube in its axial direction.

The fastening apparatus preferably comprises a locking element. It is preferred that the locking element is configured to block, in a locked state, a so movement of the outer sleeve in the axial direction relative to the inner sleeve, but to permit a movement of the outer sleeve in a circumferential direction of the inner sleeve. It is preferred that the locking element is configured to permit, in a partially locked state, a movement of the outer sleeve in the axial direction relative to the inner sleeve in such a way that the contact between the inner sleeve and the outer sleeve is maintained. It is preferred that the locking element is configured to permit, in an unlocked state, a complete removal of the outer sleeve from the inner sleeve.

The fastening apparatus preferably comprises a connecting element. It is preferred that the connecting element is configured to couple, in a connected state, the holding element to the outer sleeve. It is preferred that the connecting element is configured to permit, in an unconnected state, a complete removal of the holding element from the outer sleeve.

The disclosure herein provides a fastening arrangement for fastening a cabin interior component to an attachment structure of an aircraft cabin, the fastening arrangement having an attachment structure, which has at least one fastening tube, a cabin interior component and a preferred fastening apparatus, the inner sleeve being fixed on the fastening tube in such a way that the inner sleeve cannot be moved relative to the fastening tube, the fastening tube being received into the inner sleeve opening, the outer sleeve being fastened to the inner sleeve in such a way that the outer sleeve can be rotated relative to the inner sleeve about a common axis, the inner sleeve being received into the outer sleeve opening, so with the result that the outer sleeve is mounted rotatably relative to the inner sleeve, the holding element being fixed on the cabin interior component in such a way that the holding element cannot be moved relative to the cabin interior component, the holding element gripping the alignment region over the full surface area, with the result that the holding element is aligned relative to the fastening tube in an axial direction of the fastening tube.

The disclosure herein provides an aircraft cabin of an aircraft, the aircraft cabin having a preferred fastening apparatus and/or a preferred fastening arrangement.

The disclosure herein provides an aircraft, preferably airplane, with a preferred fastening apparatus, a preferred fastening arrangement and/or a preferred aircraft cabin.

The disclosure herein is based on the concept of modularization. An attachment structure is attached to the primary structure of the aircraft. The attachment structure serves as an interface between cabin interior components and the aircraft cabin. The attachment structure is configured, for example, as a tube which can serve as a load distributor. The attachment structure makes it possible to decouple the load transmission between the primary structure and cabin interior components, and overall provides a universal attachment point. The cabin interior components include, for example, interior panels, seats or seat rows, hat racks, overhead bins, cabin monuments (for example, bathrooms and galley), luggage bins and the like.

In the case of some of the cabin interior components, such as, for instance, the hat racks, a small rotation is to be possible, in order to avoid parasitic loads on the secondary and primary structure. An embodiment as a circular fastening tube is therefore advantageous. The fastenings can preferably be plugged on or clipped in, in order that a simple and rapid installation and maintenance is possible. In addition, the fastenings should make it possible to attach a fixed or pivotable container.

The attachment structure provides a high accuracy with regard to the positioning. Furthermore, the attachment structure serves for homogeneous load distribution. For this purpose, the attachment structure preferably has at least one fastening tube. It is a further concept of the disclosure herein to configure the interface between the cabin interior component and the attachment structure in such a way that they can grip one another in a positively locking manner and can be centered automatically along the direction of extent of the fastening tube. Furthermore, the fixing by a single pin is to be possible.

Accordingly, a single standardized fastening apparatus is proposed for all possible types of cabin interior components and their accessories, which fastening apparatus is capable of fastening the corresponding parts to the attachment structure.

In particular, the aim is a decoupled rotational attachment of the cabin interior component to the attachment structure. In other words, the cabin interior component can be mounted rotationally in order to compensate for so certain tolerances and in order to avoid the transmission of undesired torques. Accordingly, the fastening tube can have a comparatively thin wall thickness, in order to save weight. Along its direction of extent, the fastening tube can have a plurality of latching depressions which are spaced apart from one another at a uniform pattern dimension along the longitudinal direction. An inner sleeve can be pushed onto the fastening tube. The inner sleeve can have a pair of lugs, in order to limit a movement of an outer sleeve.

The outer sleeve can likewise be plugged onto the inner sleeve and, apart from any movement limitation by way of the pair of lugs, can be rotated about an axis common with the inner sleeve. A holding element which is connected fixedly to the cabin interior component can be plugged onto the outer sleeve, and centers itself in the process along the direction of extent of the fastening tube. The holding element preferably forms a contact over the full surface area with the outer sleeve on a cylindrical circumferential face or on at least one side, preferably two or three sides, of the outer sleeve. The holding element is fixed with the aid of a pin which, for example, can be pushed from below through the holding element into the outer sleeve.

Overall, a system can thus be produced which has a fastening which is optimized for the installation and maintenance, can be used in a flexible manner for movable and immovable cabin interior components, and makes simple access to the fastening apparatus possible.

BRIEF DESCRIPTION OF THE DRAWINGS

Example embodiments will be explained in greater detail on the basis of the appended diagrammatic drawings, in which.

DETAILED DESCRIPTION

Figure 1:
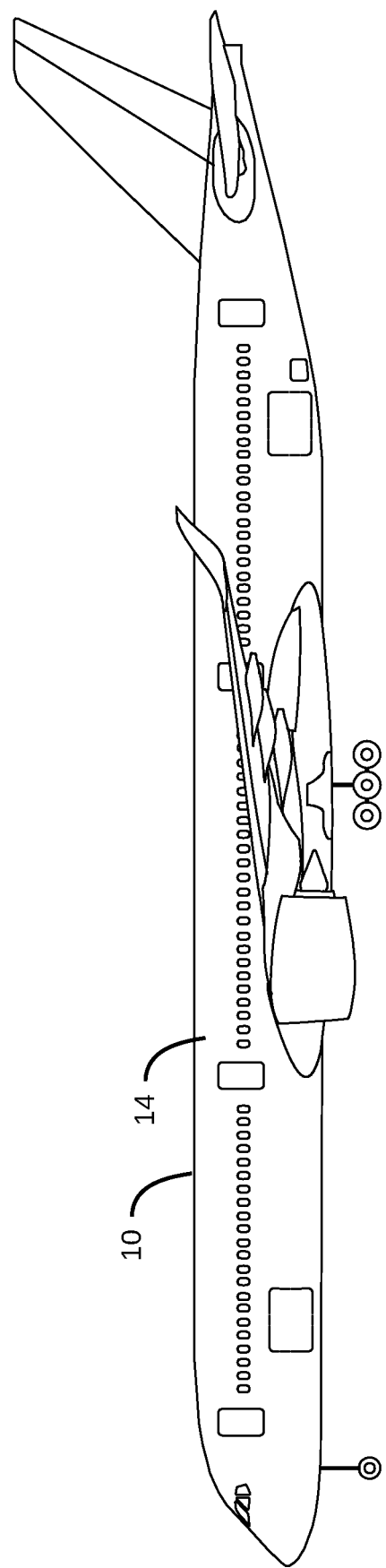
FIG. 1 shows one example embodiment of an aircraft.
Figure 2:
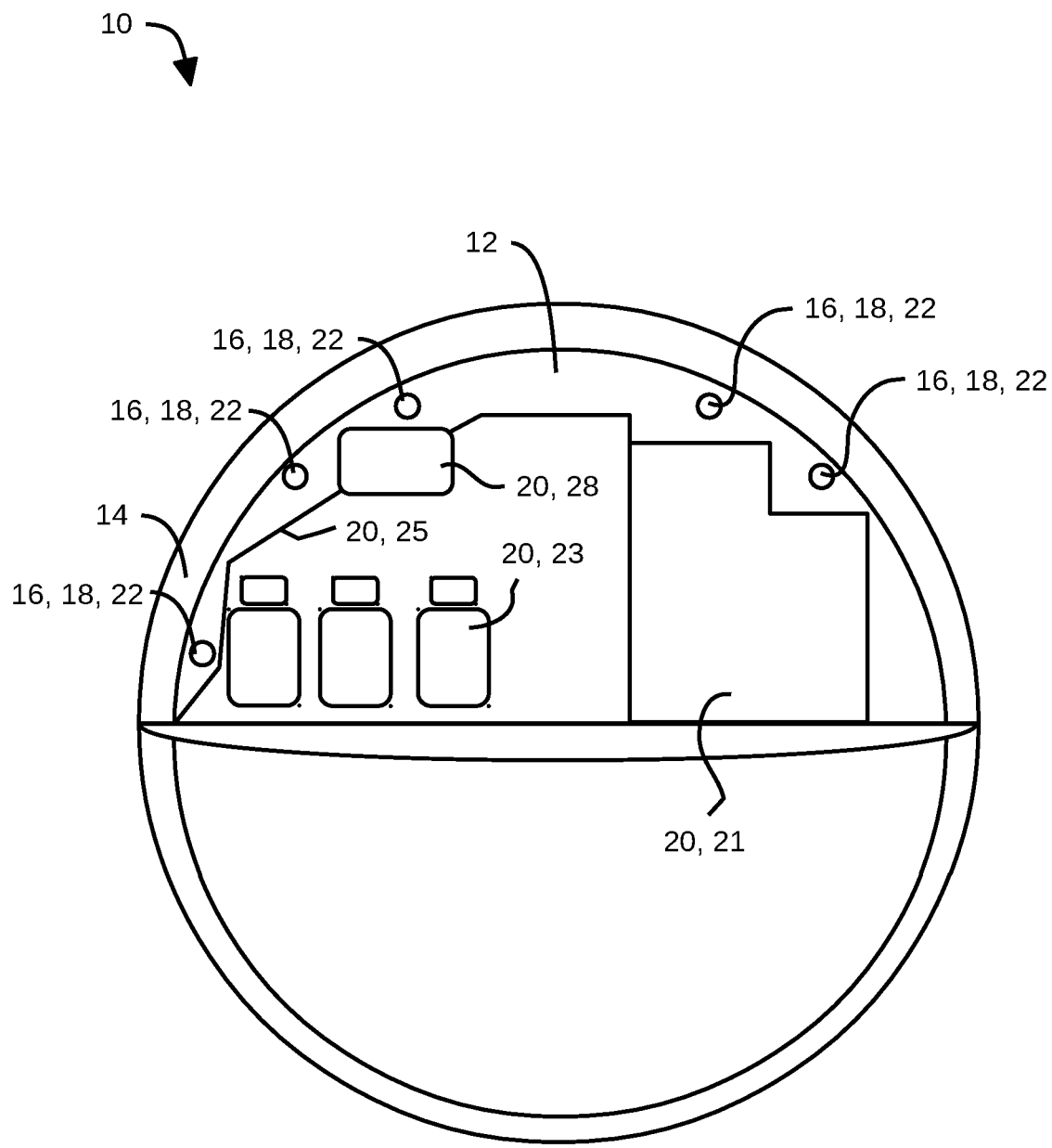
FIG. 2 shows a cross-sectional view of an aircraft fuselage.

Reference is made first of all to FIG. 1 which shows an aircraft 10. The aircraft 10 comprises an aircraft cabin 12 which is known per se, for example for passengers. The aircraft cabin 12 has a primary structure 14 and a secondary structure 16.

Furthermore, the secondary structure 16 comprises an attachment structure 18. The attachment structure 18 serves as an interface, in order to fasten a cabin interior component 20 indirectly to the primary structure 14. The attachment structure 18 comprises at least one fastening tube 22 which extends along the direction of flight.

The cabin interior component 20 is, for example, a cabin monument 21, a seat 23, an interior panel 25 or a luggage bin 28.

Figure 3:
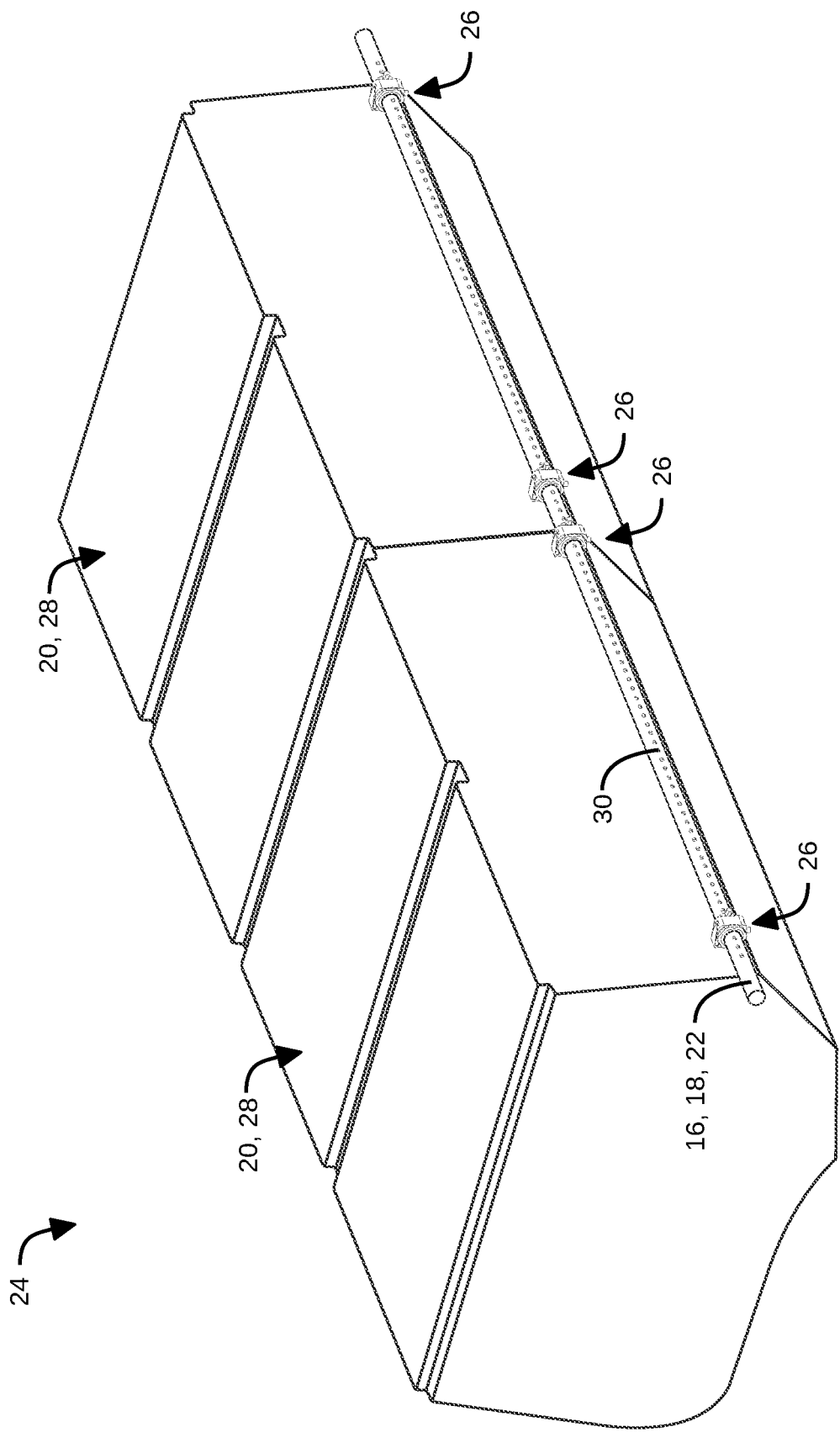
FIG. 3 shows a view of a fastening arrangement in the assembled state.
Figure 4:
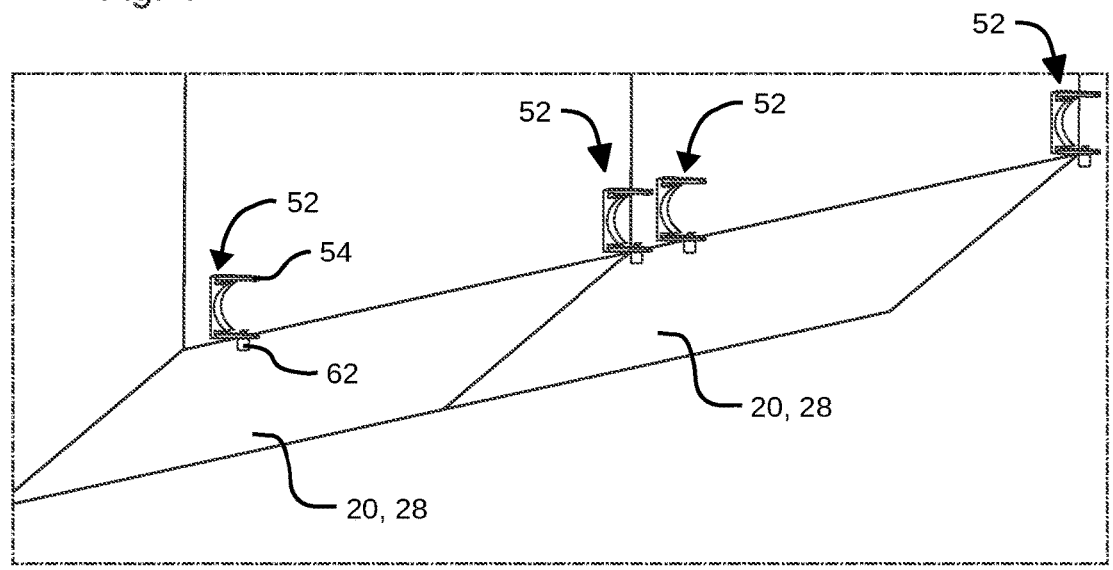
FIG. 4 shows a view of a cabin interior component.
Figure 5:
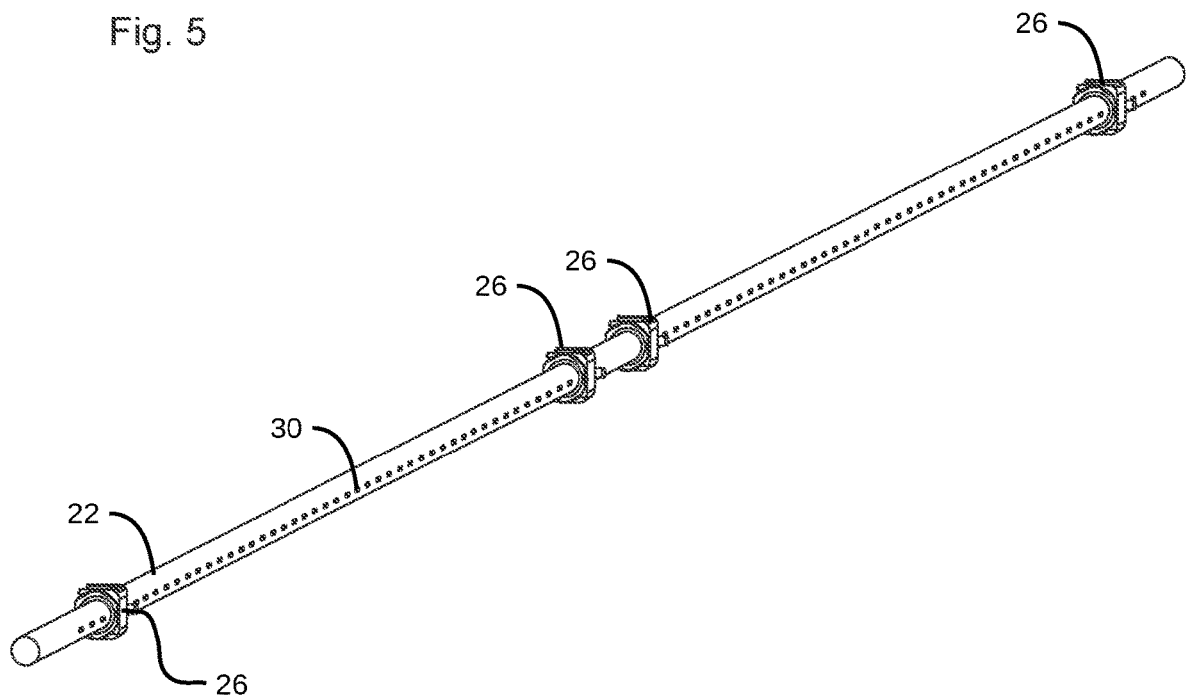
FIG. 5 shows a view of an attachment structure.
Figure 6:
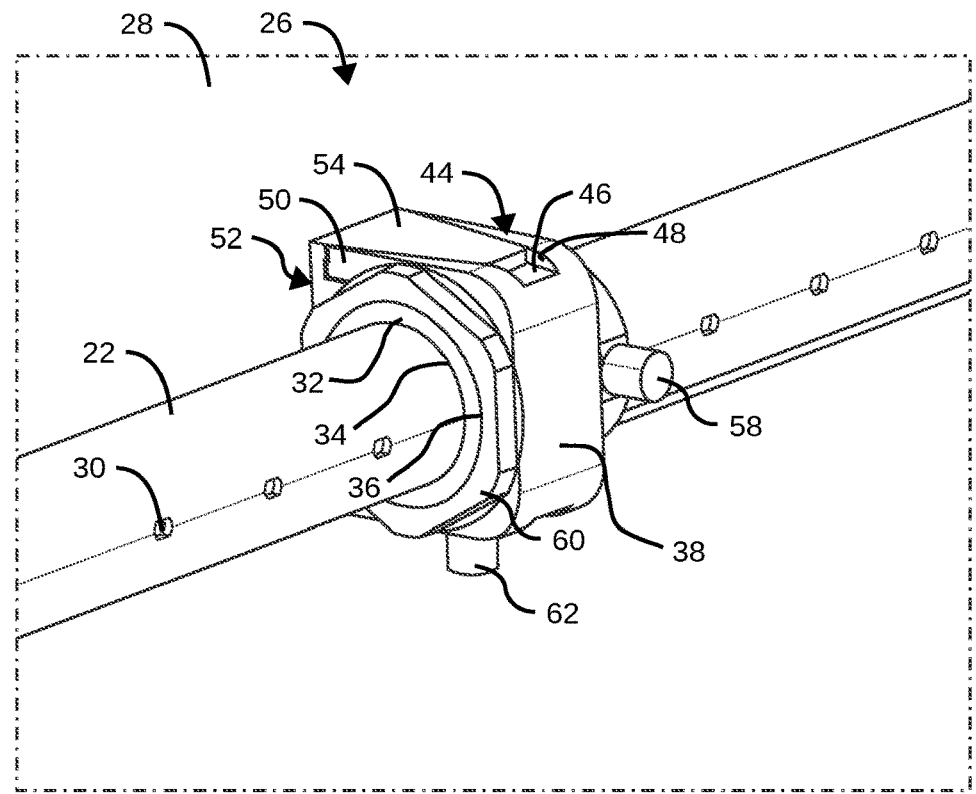
FIG. 6 through FIG. 9 show one example embodiment of a fastening apparatus.
Figure 7:
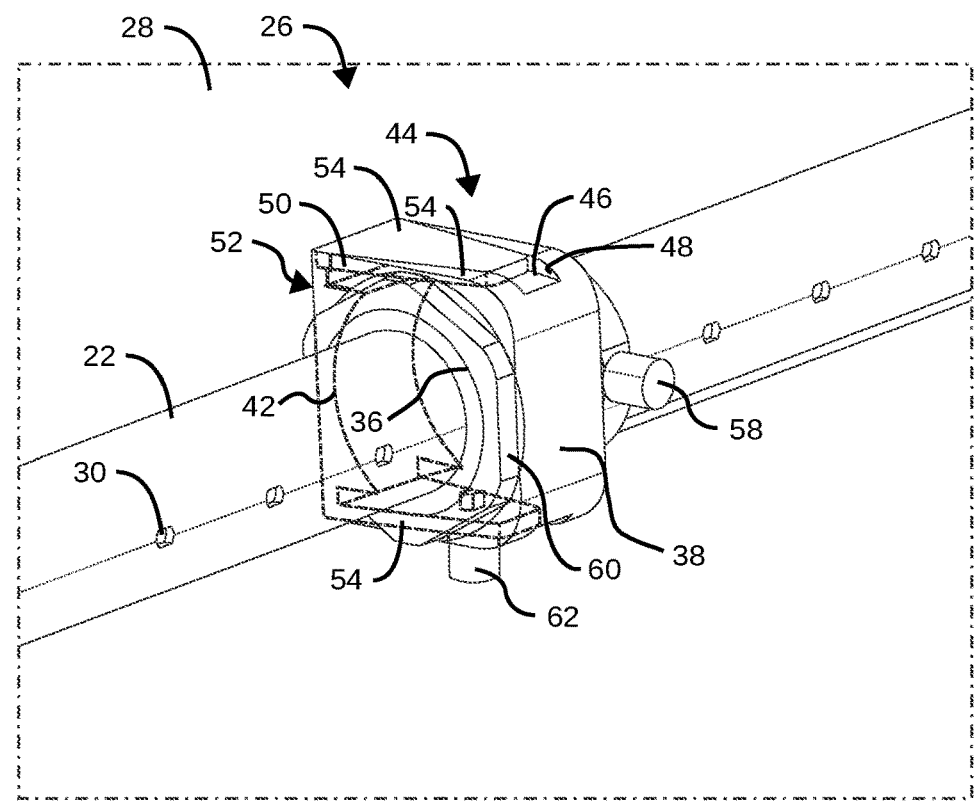
Figure 8:
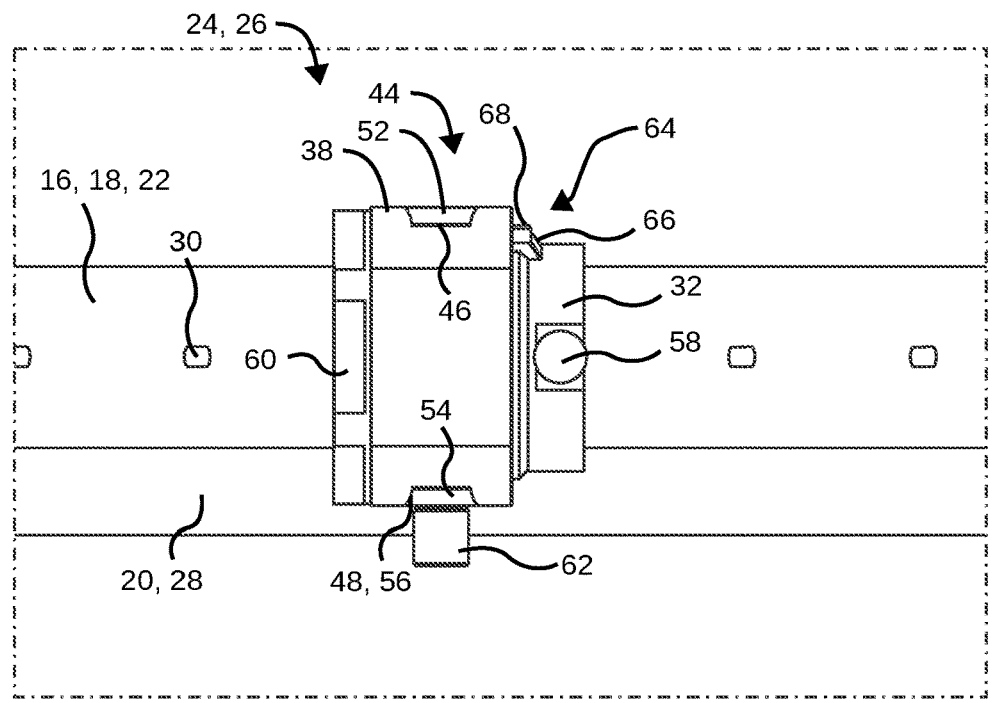
Figure 9:
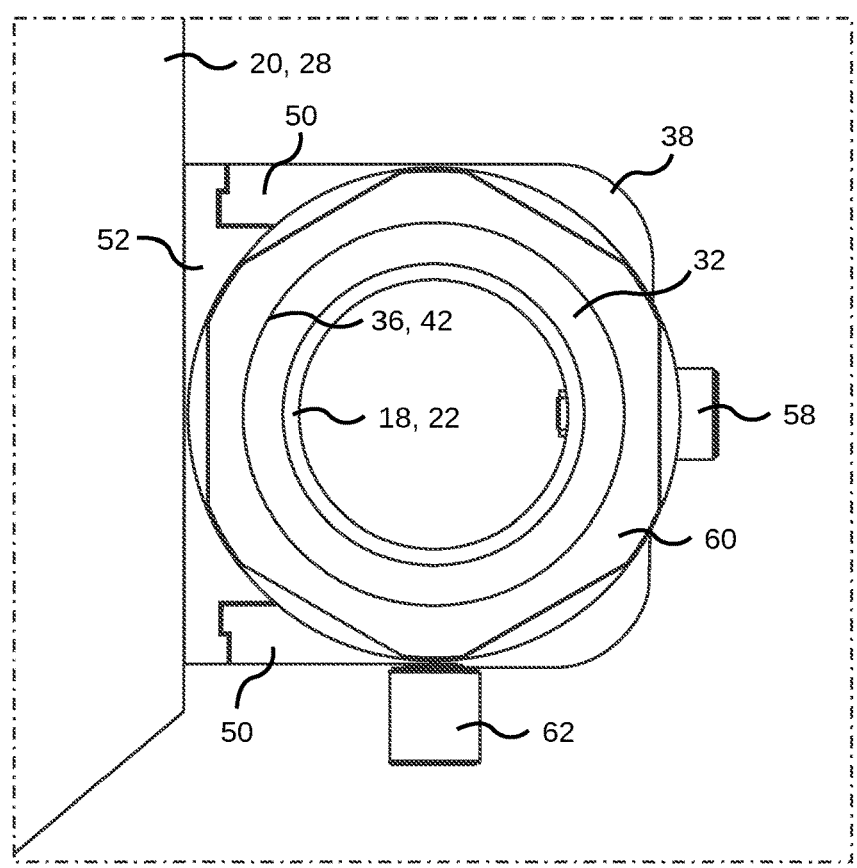

Reference is made in the following text to FIG. 3 through FIG. 5. FIG. 3 shows a fastening arrangement 24 in the assembled state, that is to say the cabin interior component 20 is fastened to the attachment structure 18 by a plurality of fastening apparatuses 26.

The concept is explained in greater detail on the basis of the luggage bin 28. The luggage bin 28 can be mounted fixedly or can be of pivotable configuration, as disclosed in DE 10 2017 217 216 B4. Reference is made to FIGS. 3 and 4 there.

Reference is made in the following text, in particular, to FIGS. 6 through 9. As can be seen therein, the fastening tube 22 has a plurality of latching depressions 30. The latching depressions are arranged along the fastening tube 22 equidistantly at a defined pattern dimension. For example, the pattern dimension is one inch.

The fastening apparatus 26 has an inner sleeve 32. The inner sleeve 32 is preferably of cylindrical configuration. The inner sleeve 32 can be plugged onto the fastening tube 22 and can be displaced along the direction of extent of the fastening tube 22.

The inner sleeve 32 has an inner sleeve opening 34. The inner sleeve opening 34 has a diameter which corresponds to the diameter of the fastening tube 22. In other words, the inner sleeve opening 34 defines a through opening, the circumferential face of which grips the fastening tube 22 with a contact over the full surface area when the inner sleeve 32 is plugged onto the fastening tube 22.

In addition, the inner sleeve 32 has an outer circumferential face 36. The outer circumferential face 36 is preferably a cylindrical shell face and serves, in particular, for mounting an outer sleeve 38.

The fastening apparatus 26 has an outer sleeve 38. The outer sleeve 38 can be of cylindrical configuration. In the present case, the outer sleeve 38 is of cuboid-like configuration with rounded regions. The outer sleeve comprises an outer sleeve opening 40. The outer sleeve opening 40 is adapted to the outer circumferential face 36 of the inner sleeve 32 independently of the outer shape of the outer sleeve 38. The outer sleeve opening 40 is preferably configured as a through opening which has an inner circumferential face 42.

The outer sleeve 38 can be pushed over the inner sleeve 32, with the result that the outer circumferential face 36 of the inner sleeve 32 comes into contact over the full surface area with the inner circumferential face 42 of the outer sleeve 38. Therefore, the outer sleeve 38 is mounted such that it can be rotated around the inner sleeve 32.

The outer sleeve 38 has an alignment region 44. The alignment region 44 is arranged, for example, on the upper side and the lower side of the outer sleeve 38. The alignment region 44 can comprise a tapering groove 46. The groove 46 is preferably defined by way of two obliquely running side wall regions 48. The alignment region 44 is shaped in such a way that a holding element 52 which is pushed into the alignment region 44 is aligned along the direction of extent of the fastening tube 22. The alignment region 44 can also be called a centering region, and the alignment can also be called centering.

Furthermore, the outer sleeve 38 has an outer limb 50. The outer limb 50 projects in the direction of the cabin interior component 20 in the installed state. The outer limb 50 makes a positively locking attachment of a holding element 52 possible.

The fastening apparatus 26 has a holding element 52. The holding element 52 is of C-shaped configuration. The holding element 52 is shaped in such a way that it can engage around the outer sleeve 38 in such a way that pulling-off is possible in a direction transversely with respect to the axial direction of the outer sleeve 38.

In the present case, the holding element 52 has a pair of holding limbs 54. The holding limbs 54 project in the direction of the outer sleeve 38. Each holding limb 54 is shaped in such a way that it corresponds to the groove 46. In other words, the holding limbs 54 grip the respective groove 46 in the case of plugging-in of the holding element 52. The holding limb 54 is preferably of tapering configuration and is adapted to the tapering groove 46.

Each holding limb 54 can have one or more contact faces 56. The contact face 56 is arranged in such a way that the contact face 56 can grip the side wall region 48 in the case of plugging-in of the holding element 52. As a consequence, the holding element 52 is aligned or centered along the axial direction of the fastening tube 22 with the aid of the outer sleeve 38.

The holding element 52 is fixed on the cabin interior component 20. The fastening apparatus 26 comprises a fixing element 58 which fixes the inner sleeve 32 immovably on the attachment structure 18. The fixing element 58 is preferably configured as a latching pin. The fixing element 58 is not restricted to this embodiment, however. Threaded bolts or other fasteners are also conceivable.

Furthermore, the fastening apparatus 26 comprises a locking element 60. In the present case, the locking element 60 is configured as a threaded nut. The locking element 60 is not restricted to this embodiment, however, and can also be configured as a bolt, screw, latching pin or the like. The locking element 60 blocks the outer sleeve 38 in the axial direction, with the result that the outer sleeve 38 cannot be released from the inner sleeve 32 in the axial direction, whereas the locking element 60 permits a rotational movement of the outer sleeve 38 relative to the inner sleeve 32.

Furthermore, the fastening apparatus 26 comprises a connecting element 62. The connecting element 62 is preferably configured as a latching pin. The connecting element 62 is not restricted to this embodiment, however, and can also be configured as a bolt, screw and the like. The connecting element 62 prevents a release of the holding element 52 from the outer sleeve 38. The connecting element 62 is preferably plugged through one of the holding limbs 54 into the outer sleeve 38.

Furthermore, the fastening apparatus 26 can have a movement limiting device 64. The movement limiting device 64 limits the angular range of the rotational movement which can be carried out by the outer sleeve 38 relative to the inner sleeve 32. The selection of the angular range is dependent on the cabin interior component 20 to be fastened. The angular range for a fixed luggage bin 28 is thus limited to a few degrees, whereas, in the case of a movable luggage bin 28, the angular range is selected such that opening and closing of the luggage bin 28 is possible.

The movement limiting device 64 can have a pair of blocking regions 66 which are preferably configured on the outer sleeve 38. Between them, the blocking regions 66 define a cut-out and therefore the accessible angular range.

Furthermore, the movement limiting device 64 comprises a projection 68 which preferably projects in the axial direction from the inner sleeve 32. In the installed state, the projection 68 is arranged between the blocking regions 66 and comes into contact with the blocking regions 66 in each case at the end of the permitted angular range.

Reference is made to FIG. 10 through FIG. 13 which show an assembly sequence for a fixed luggage bin 28. As shown, the attachment structure 18 in this example comprises two fastening tubes 22, a first fastening tube 70 being mounted such that it cannot be moved relative to the primary structure 14. A second fastening tube 72 is configured such that it can be pivoted relative to the primary structure 14. Fastening apparatuses 26 with the exception of the holding elements 52 are attached to each fastening tube 70, 72.

In contrast, the holding elements 52 are fixed on the upper side and rear side of the luggage bin 28 which is to be installed.

Figure 10:
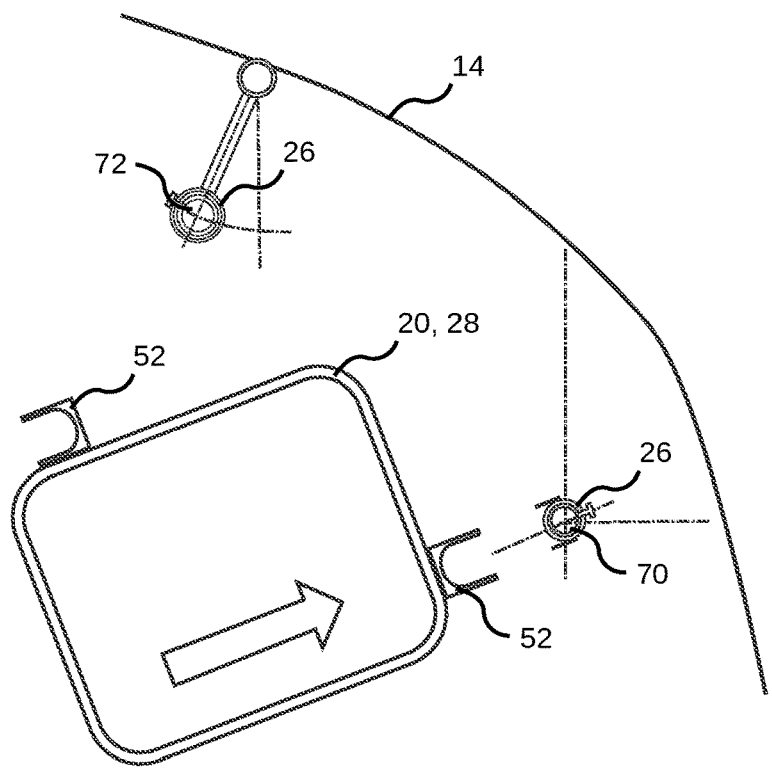
FIG. 10 through FIG. 13 show mounting of a fixed luggage bin.
Figure 11:
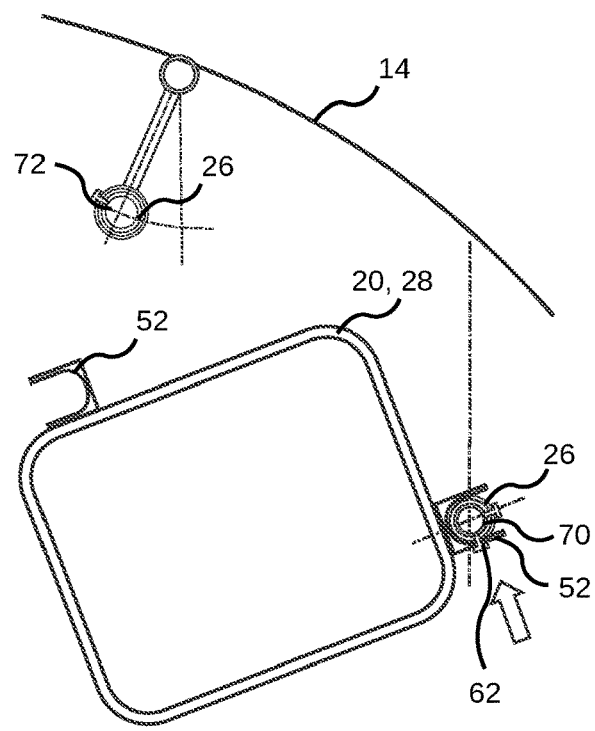

As shown in FIG. 10, the luggage bin 28 is plugged with the holding elements 52 which are mounted on the rear side onto the outer sleeve 38 in a first step.

Then, as shown in FIG. 1, the rear-side holding element 52 is connected by way of the connecting element 62 to the outer sleeve 38.

Figure 12:
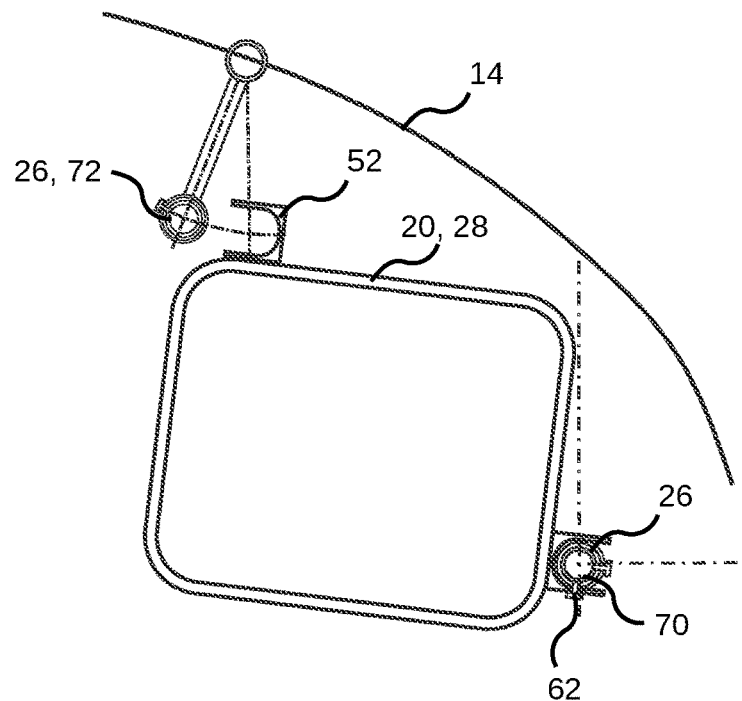
Figure 13:
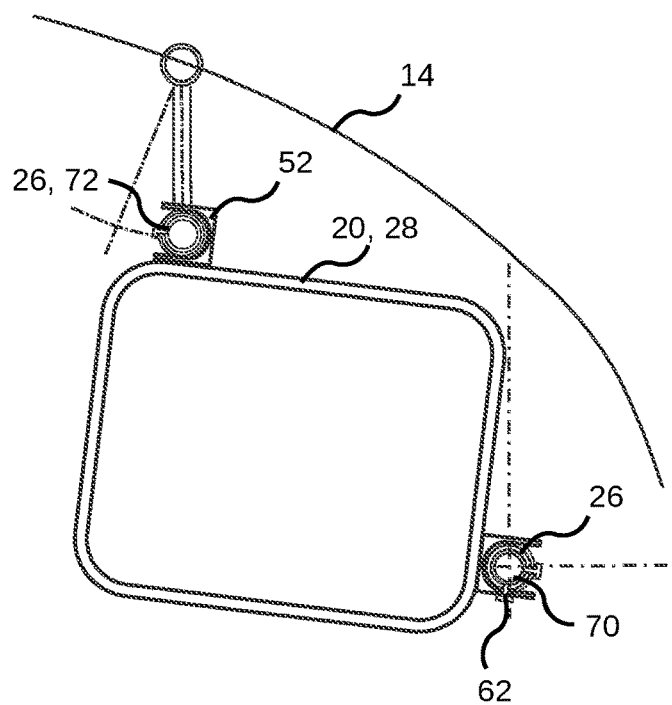

As shown in FIG. 12, the luggage bin is rotated around the first fastening tube 70 and is moved into a position in which the fastening tube 72 can be pivoted into the holding element 52 which is attached on the upper side, as shown in FIG. 13. Finally, the connecting elements 62 are also inserted there, with the result that the luggage bin 28 is mounted in the finished state.

It should be noted that a whole row of luggage bins can be installed in this way without great effort in one working step, and individual mounting of the luggage bins 28 can be dispensed with.

Figure 14:
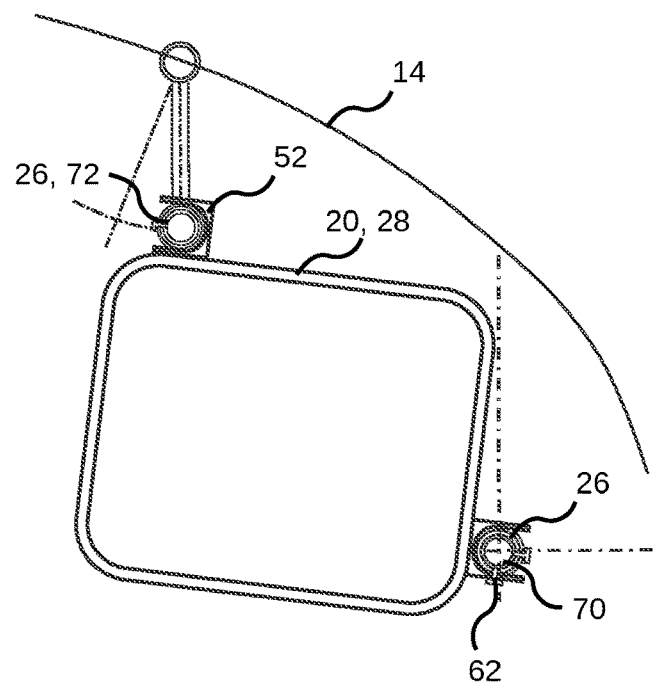
FIG. 14 and FIG. 15 show dismantling for maintenance purposes.
Figure 15:
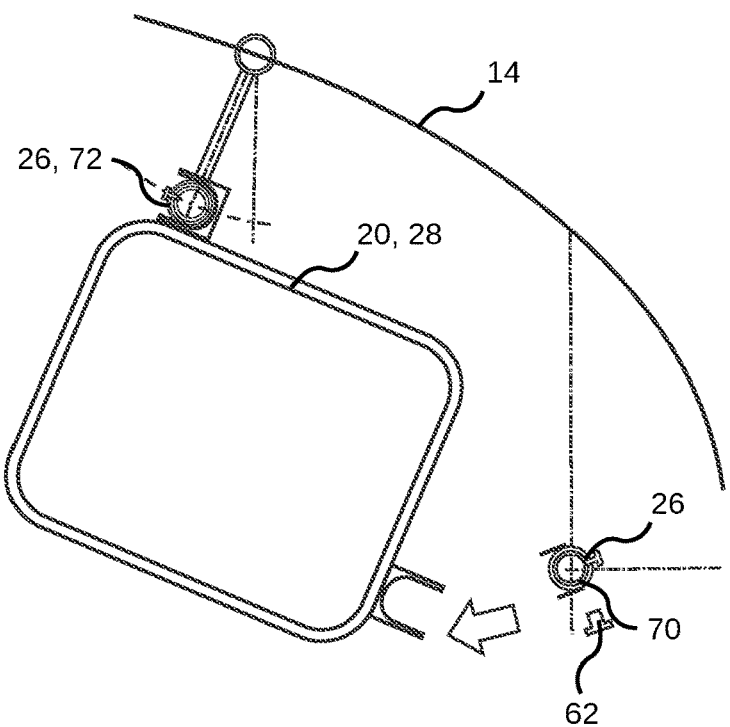

Releasing of the luggage bins 28 for maintenance will be described on the basis of FIG. 14 and FIG. 15.

Various lines and cables can be situated behind the luggage bins 28, and are to be capable of being reached as simply as possible by the maintenance staff. Starting from the configuration in FIG. 14, two approaches are possible. Firstly, the connecting elements 62 of the rear-side holding elements 52 can be removed, with the result that the luggage bin 28 can be pulled off from the outer sleeves 38 and can be pivoted by the second fastening tube 72 in such a way that the region behind the luggage bin 28 is accessible.

Secondly, it is also conceivable that the first fastening tube 70 is released from the primary structure 14, and all the luggage bins 28 which are attached to it can be moved out of the way with the aid of the first fastening tube 70.

When the maintenance is concluded, the steps are carried out in the reverse sequence, in order to move the luggage bin 28 to its provided location again.

Figure 16:
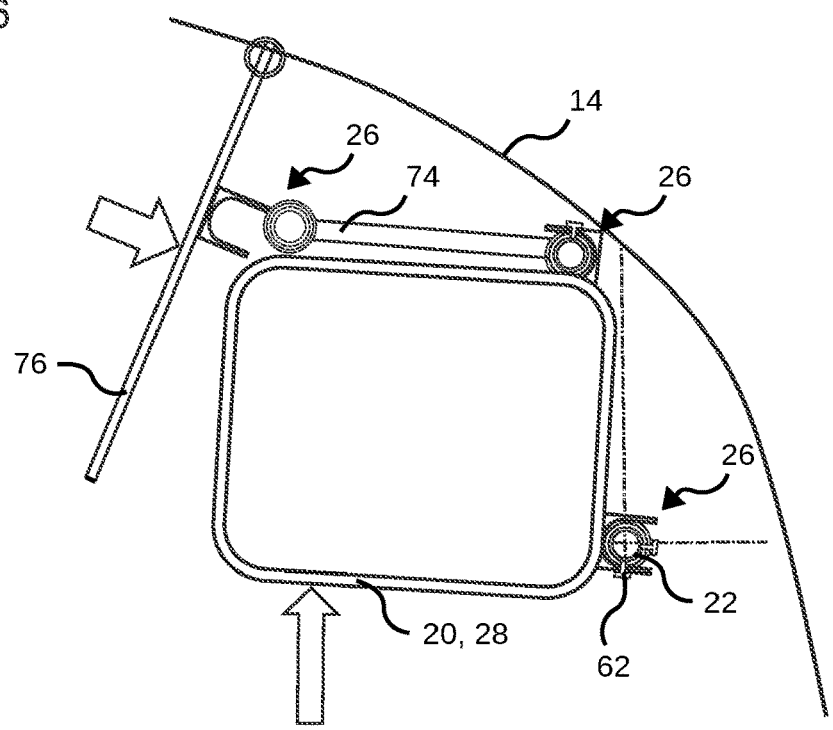
FIG. 16 and FIG. 17 show an illustration of a movable luggage bin.
Figure 17:
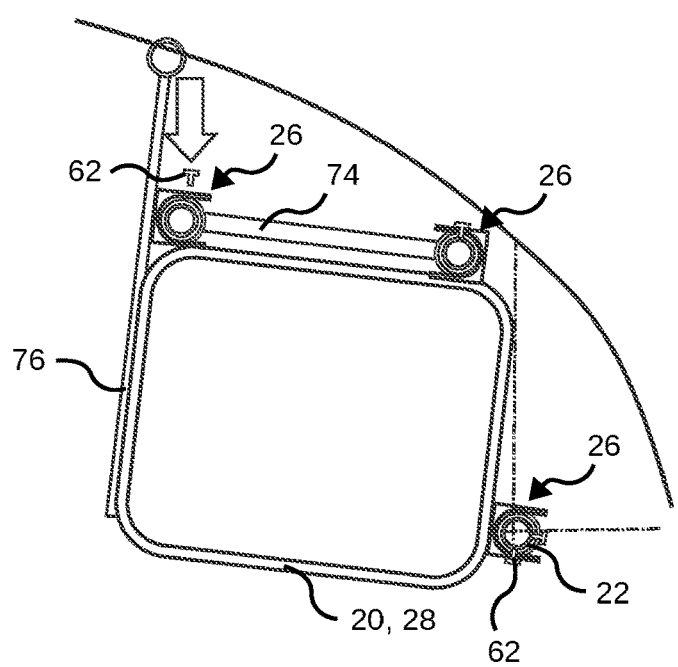

In the following text, reference will be made to FIG. 16 and FIG. 17. Unlike before, the attachment structure 18 has merely one fastening tube. In addition, the attachment structure 18 comprises a drive rod 74 which has ends which are in each case of cylindrical configuration and match the inner sleeve 32.

In addition, the movable luggage bin 28 has a cover 76. The luggage bin 28 is fastened to the fastening tube 22 by the rear-side holding element 52. On the upper side and the rearward half of the luggage bin 28, the luggage bin 28 is fastened to one end of the drive rod 74 by the holding element 52. The fastening apparatus 26 is likewise attached to the other end of the drive rod 74. The cover 76 has a holding element 52 which is fastened to the further fastening apparatus 26 of the drive rod 74.

If the cover 76 is then moved in the opening direction, the entire luggage bin tilts forwards and can be loaded. For the method of operation, reference is made expressly to DE 10 2017 217 216 B4, FIG. 3 and FIG. 4 therein, and the associated description.

The modular fastening apparatus 26 is proposed in order to improve the installation time and the maintenance time. The fastening apparatus 26 makes the decoupled rotational attachment of cabin interior components 20 to the attachment structure 18 possible, which attachment structure 18 is in turn supported by the primary structure 14 of the aircraft 10. The cabin interior component 20, for example a luggage bin 28, can be fastened simply by the fastening apparatus 26. The fastening apparatus 26 comprises an inner sleeve 32 which can be plugged over a predefined fastening tube 22. An outer sleeve 38 can be fastened rotatably to the inner sleeve 32. The outer sleeve 38 has a groove 46 for centering the luggage bin 28. The centering takes place by a holding element 52 which is pushed onto the outer sleeve 38. The fastening apparatus 26 can compensate for tolerances between the attachment structure 18 and the cabin interior component 22 and can prevent the transmission of undesired forces and torques.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Aircraft
12 Aircraft cabin
14 Primary structure
16 Secondary structure
18 Attachment structure
20 Cabin interior component
21 Cabin monument
22 Fastening tube
23 Seat
24 Fastening arrangement
25 Interior panel
26 Fastening apparatus
28 Luggage bin
30 Latching depression
32 Inner sleeve
34 Inner sleeve opening
36 Outer circumferential face
38 Outer sleeve
40 Outer sleeve opening
42 Inner circumferential face
44 Alignment region
46 Groove
48 Side wall region
50 Outer limb
52 Holding element
54 Holding limb
56 Contact face
58 Fixing element
60 Locking element
62 Connecting element
64 Movement limiting device
66 Blocking region
68 Projection
70 First fastening tube
72 Second fastening tube
74 Drive rod
76 Cover

The invention claimed is:

1. A fastening apparatus for fastening a cabin interior component to an attachment structure of an aircraft cabin, the attachment structure having at least one fastening tube, the fastening apparatus having:

an inner sleeve, which can be fixed on the fastening tube such that that the inner sleeve cannot be moved relative to the fastening tube, the inner sleeve having an inner sleeve opening, into which the fastening tube can be received;
an outer sleeve, which can be fastened to the inner sleeve such that the outer sleeve is rotatable relative to the inner sleeve about a common axis; and
a holding element, which can be:
fastened to the outer sleeve; and
fixed on the cabin interior component such that the holding element cannot be moved relative to the cabin interior component;
wherein the outer sleeve comprises:
an outer sleeve opening, which is configured to receive and to rotatably support the inner sleeve therein; and
an alignment region, which is configured to align the holding element relative to the outer sleeve and the fastening tube; and
wherein the holding element is shaped to engage with the alignment region of the outer sleeve for aligning the holding element relative to the fastening tube about the common axis.

2. The fastening apparatus according to claim 1, wherein:
the alignment region extends in a longitudinal direction which runs orthogonally with respect to an axial direction of the outer sleeve; and
the alignment region is configured such that, in case of a movement of the holding element parallel to the longitudinal direction, the holding element can be displaced parallel to the axial direction.

3. The fastening apparatus according to claim 1, wherein the outer sleeve has at least one outer limb which, in an installed state, projects in a direction of the holding element, in order to grip the holding element in a positively locking manner in a circumferential direction and to permit a displacement in an axial direction for purpose of alignment.

4. The fastening apparatus according to claim 1, wherein the alignment region is on at least one outer circumferential face of the outer sleeve.

5. The fastening apparatus according to claim 1, wherein the holding element has at least one holding limb which extends in a longitudinal direction which, in an installed state, runs orthogonally with respect to an axial direction of the outer sleeve, and the holding limb is configured such that, in case of a movement of the holding element parallel to the longitudinal direction, the holding element can be displaced parallel to the axial direction.

6. The fastening apparatus according to claim 1, wherein the holding element has at least one stepped region which, in an installed state, faces the outer sleeve, in order to grip the outer sleeve in a positively locking manner in a circumferential direction and to permit a displacement in an axial direction for purpose of alignment.

7. The fastening apparatus according to claim 1, wherein the holding element is configured such that it can be plugged onto the outer sleeve in a direction orthogonally with respect to an axial direction of the outer sleeve.

8. The fastening apparatus according to claim 1, comprising a movement limiting device configured to limit relative movement of the outer sleeve with respect to the inner sleeve to an angular range of less than 270°.

9. The fastening apparatus according to claim 8, wherein the movement limiting device has a projection and a pair of blocking regions, the projection being between the blocking regions and gripping one of the blocking regions at an end of the angular range.

10. The fastening apparatus according to claim 8, wherein the movement limiting device is configured on the inner sleeve and the outer sleeve.

11. The fastening apparatus according to claim 1, wherein the outer sleeve is configured such that it can be plugged onto the inner sleeve along an axial direction of the inner sleeve.

12. The fastening apparatus according to claim 1, comprising:
  a fixing element configured to block, in a fixed state, any movement of the inner sleeve relative to the fastening tube, and to permit, in a released state, a movement of the inner sleeve relative to the fastening tube in its axial direction; and/or
  a locking element configured to block, in a locked state, a movement of the outer sleeve in the axial direction relative to the inner sleeve, but to permit a movement of the outer sleeve in a circumferential direction of the inner sleeve, to permit, in a partially locked state, a movement of the outer sleeve in the axial direction relative to the inner sleeve such that the contact between the inner sleeve and the outer sleeve is maintained, and to permit, in an unlocked state, a complete removal of the outer sleeve from the inner sleeve; and/or
  a connecting element which is configured to couple, in a connected state, the holding element to the outer sleeve, and to permit, in an unconnected state, a complete removal of the holding element from the outer sleeve.

13. A fastening arrangement for fastening a cabin interior component to an attachment structure of an aircraft cabin, the fastening arrangement comprising:
  the attachment structure, which has at least one fastening tube;
  the cabin interior component; and
  a fastening apparatus according to claim 1,
  wherein the inner sleeve is fixed on the fastening tube such that the inner sleeve cannot be moved relative to the fastening tube;
  wherein the fastening tube is received into the inner sleeve opening;
  wherein the outer sleeve is fastened to the inner sleeve such that the outer sleeve is rotatable relative to the inner sleeve about a common axis;
  wherein the inner sleeve is received into the outer sleeve opening, such that the outer sleeve is mounted rotatably relative to the inner sleeve;
  wherein the holding element is fixed on the cabin interior component such that the holding element cannot be moved relative to the cabin interior component; and
  wherein the holding element grips the alignment region over a full surface area, such that the holding element is aligned relative to the fastening tube in an axial direction of the fastening tube.

14. The fastening arrangement according to claim 13, wherein:
  the alignment region extends in a longitudinal direction which runs orthogonally with respect to an axial direction of the outer sleeve; and
  the alignment region is configured such that, in case of a movement of the holding element parallel to the longitudinal direction, the holding element can be displaced parallel to the axial direction.

15. The fastening arrangement according to claim 13, wherein the outer sleeve has at least one outer limb which, in an installed state, projects in a direction of the holding element, in order to grip the holding element in a positively locking manner in a circumferential direction and to permit a displacement in an axial direction for purpose of alignment.

16. The fastening arrangement according to claim 13, wherein the alignment region is on at least one outer circumferential face of the outer sleeve.

17. The fastening arrangement according to claim 13, wherein the holding element has at least one holding limb which extends in a longitudinal direction which, in an installed state, runs orthogonally with respect to an axial direction of the outer sleeve, and the holding limb is configured such that, in case of a movement of the holding element parallel to the longitudinal direction, the holding element can be displaced parallel to the axial direction.

18. The fastening arrangement according to claim 13, wherein the holding element has at least one stepped region which, in an installed state, faces the outer sleeve, in order to grip the outer sleeve in a positively locking manner in a circumferential direction and to permit a displacement in an axial direction for purpose of alignment.

19. An aircraft or aircraft cabin comprising:
  an attachment structure having at least one fastening tube;
  a fastening apparatus for fastening a cabin interior component to the attachment structure, the fastening apparatus comprising:
    an inner sleeve fixed on the fastening tube such that that the inner sleeve cannot be moved relative to the fastening tube, the inner sleeve having an inner sleeve opening, into which the fastening tube is received;
    an outer sleeve fastened to the inner sleeve such that the outer sleeve is rotatable relative to the inner sleeve about a common axis; and
    a holding element, which is:
      fastened to the outer sleeve; and
      fixed on the cabin interior component such that the holding element cannot be moved relative to the cabin interior component;
    wherein the outer sleeve comprises:
      an outer sleeve opening, which receives and rotatably supports the inner sleeve therein; and
      an alignment region, which aligns the holding element relative to the outer sleeve and the fastening tube; and
    wherein the holding element engages with the alignment region of the outer sleeve to align the holding element relative to the fastening tube about the common axis.

20. An aircraft or aircraft cabin comprising:
  a fastening arrangement for fastening a cabin interior component to an attachment structure, the fastening arrangement comprising:
    the attachment structure, which has at least one fastening tube;
    the cabin interior component; and
    a fastening apparatus comprising:
      an inner sleeve fixed on the fastening tube such that the inner sleeve cannot be moved relative to the fastening tube, wherein the inner sleeve has an inner sleeve opening, into which the fastening tube is received such that the inner sleeve cannot be moved relative to the fastening tube;
      an outer sleeve fastened to the inner sleeve such that the outer sleeve is rotatable relative to the inner sleeve about a common axis; and
      a holding element, which is:
        fastened to the outer sleeve; and fixed on the cabin interior component such that the holding element cannot be moved relative to the cabin interior component;
wherein the outer sleeve comprises:
an outer sleeve opening, which receives and rotatably supports the inner sleeve therein; and
an alignment region, which aligns the holding element relative to the outer sleeve and the fastening tube;
wherein the holding element grips the alignment region over a full surface area, such that the holding element is aligned relative to the fastening tube in an axial direction of the fastening tube.

* * * * *